US012488732B2

(12) United States Patent
Jeon et al.

(10) Patent No.: US 12,488,732 B2
(45) Date of Patent: *Dec. 2, 2025

(54) DISPLAY DEVICE AND METHOD OF DRIVING THE SAME

(71) Applicant: SAMSUNG DISPLAY CO., LTD., Yongin-si (KR)

(72) Inventors: Joon Hyeok Jeon, Yongin-si (KR); Byoung Kwan An, Yongin-si (KR); Sang Myeon Han, Yongin-si (KR); Chang Hun Kim, Yongin-si (KR); Seung Ho Park, Yongin-si (KR); Seok Gyu Ban, Yongin-si (KR); Nam Jae Lim, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/811,239

(22) Filed: Aug. 21, 2024

(65) Prior Publication Data

US 2024/0412681 A1 Dec. 12, 2024

Related U.S. Application Data

(63) Continuation of application No. 18/319,930, filed on May 18, 2023, now Pat. No. 12,073,767.

(51) Int. Cl.
*G09G 3/3208* (2016.01)
*G06F 3/041* (2006.01)
(Continued)

(52) U.S. Cl.
CPC ......... *G09G 3/2096* (2013.01); *G09G 3/3233* (2013.01); *G09G 2300/0842* (2013.01);
(Continued)

(58) Field of Classification Search
CPC ............... G09G 3/2096; G09G 3/3233; G09G 2300/0842; G09G 2320/0257;
(Continued)

(56) References Cited

U.S. PATENT DOCUMENTS 10,262,582 B2 4/2019 Han
10,943,541 B1 * 3/2021 Tan .......................... G09G 3/32
(Continued)

FOREIGN PATENT DOCUMENTS

KR 10-2020-0115897 A 10/2020

*Primary Examiner* — Md Saiful A Siddiqui
(74) *Attorney, Agent, or Firm* — F. CHAU & ASSOCIATES, LLC

(57) ABSTRACT

A display device includes pixels connected to scan lines and data lines, each pixel including a driving transistor and at least one light emitting element, and a timing controller configured to generate output data using external input data. The timing controller includes a first compensator configured generate first data by correcting the external input data using at least one of optical measurement information, a threshold voltage of each of the driving transistors, mobility information, dimming information, and temperature information, and an afterimage compensator configured to generate second data based on age information of each light emitting element and the first data, generate third data based on a current amount corresponding to the first data and a current amount corresponding to the second data, and generate the age information by accumulating the third data.

14 Claims, 11 Drawing Sheets

(51) Int. Cl.
*G09G 3/20* (2006.01)
*G09G 3/3233* (2016.01)

(52) U.S. Cl.
CPC ............... *G09G 2320/0257* (2013.01); *G09G 2320/041* (2013.01); *G09G 2320/048* (2013.01); *G09G 2330/08* (2013.01); *G09G 2360/16* (2013.01)

(58) Field of Classification Search
CPC ....... G09G 2320/041; G09G 2320/048; G09G 2330/08; G09G 2360/16; G09G 3/32; G09G 3/006; G09G 3/20; G09G 3/3208; G09G 2300/0439; G09G 2320/043
See application file for complete search history.

(56) References Cited

U.S. PATENT DOCUMENTS

| | | | | |
|---|---|---|---|---|
| 11,049,444 | B2 | 6/2021 | Kim et al. | |
| 2006/0077136 | A1* | 4/2006 | Cok | G09G 3/3216 345/76 |
| 2014/0055500 | A1* | 2/2014 | Lai | G09G 3/006 345/77 |
| 2014/0168191 | A1* | 6/2014 | Byeon | G09G 3/3233 345/82 |
| 2017/0162103 | A1 | 6/2017 | An et al. | |
| 2017/0162109 | A1 | 6/2017 | An et al. | |
| 2017/0365202 | A1* | 12/2017 | Lin | G09G 3/3258 |
| 2019/0088199 | A1 | 3/2019 | Zhang et al. | |
| 2020/0202779 | A1* | 6/2020 | Chang | G09G 3/3266 |
| 2022/0044619 | A1* | 2/2022 | Sohn | G09G 3/20 |
| 2024/0135858 | A1 | 4/2024 | Jeon et al. | |

* cited by examiner

| | Data1 INITIAL CURRENT | AGE INFORMATION | Data2 AFTERIMAGE COMPENSATION AFTER CURRENT | CSF | Data3 COMPENSATION SCALE FACTOR COMPENSATION AFTER CURRENT |
|---|---|---|---|---|---|
| PX1 | 1A | 20% | 1.2A | 0.87 (1.5A/1.73A) | 1.04A |
| PX2 | 0.5A | 6% | 0.53A | | 0.46A |

| | INITIAL CURRENT | BLOCK AGE INFORMATION | AFTERIMAGE COMPENSATION AFTER CURRENT | CSF(B) | COMPENSATION SCALE FACTOR COMPENSATION AFTER CURRENT |
|---|---|---|---|---|---|
| BLK22 | 10A | 20% | 12A | 0.87 (15A/17.3A) | 10.4A |
| BLK24 | 5A | 6% | 5.3A | | 4.6A |

| INCH | COMPARATIVE EXAMPLE | AN EMBODIMENT |
|---|---|---|
| 65" | -20% | -6% |
| 55" | -15% | -6% |

DISPLAY DEVICE AND METHOD OF DRIVING THE SAME

CROSS-REFERENCE TO RELATED APPLICATIONS

This application is a continuation application of U.S. patent application Ser. No. 18/319,930 filed on May 18, 2023, which claims priority under 35 U.S.C. § 119 to Korean Patent Application No. 10-2022-0136007, filed on Oct. 20, 2022, the disclosures of which are incorporated by reference herein in their entireties.

TECHNICAL FIELD

Embodiments of the disclosure relate to a display device and a method of driving the same.

DISCUSSION OF RELATED ART

As technology advances, the use of a display device such as, for example, a liquid crystal display device or an organic light emitting display device, which is used to convey information to a user, has been increasing.

A display device may display an image using a plurality of pixels. The pixels implement a luminance while controlling a current amount supplied to a light emitting element using a driving transistor. The light emitting element may deteriorate over time, and thus, a predetermined afterimage may occur.

SUMMARY

An object of an embodiment of the disclosure may accumulate age information based on a current amount supplied to a light emitting element, which may increase reliability of the age information.

An object of an embodiment of the disclosure may compensate for deterioration of a light emitting element using reliable age information, which may increase afterimage compensation ability.

According to embodiments of the disclosure, a display device includes pixels connected to scan lines and data lines, each pixel including a driving transistor and at least one light emitting element, and a timing controller configured to generate output data using external input data. The timing controller includes a first compensator configured to generate first day by correcting the external input data using at least one of optical measurement information, a threshold voltage of each of the driving transistors, mobility information, dimming information, and temperature information, and an afterimage compensator configured to generate second data based on age information of each light emitting element and the first data, generate third data based on a current amount corresponding to the first data and a current amount corresponding to the second data, and generate the age information by accumulating the third data.

According to an embodiment, the display device further includes a current sensor configured to generate a global current value by measuring a current of a first power line commonly connected to the pixels, and a scale factor generator configured to generate a scale factor based on the global current value and a load of the input data.

According to an embodiment, the timing controller further includes a second compensator configured to generate the output data based on the scale factor and the second data.

According to an embodiment, the afterimage compensator includes a data changer configured to generate the second data based on the age information and the first data, a current amount calculator configured to generate a compensation scale factor based on an initial current amount corresponding to the first data and a compensation current amount corresponding to the second data, a controller configured to generate the third data based on the compensation scale factor and the second data, and an age accumulator configured to accumulate the third data as the age information.

According to an embodiment, the current amount calculator generates the compensation scale factor by dividing the initial current amount by the compensation current amount.

According to an embodiment, the controller generates the third data by multiplying the compensation scale factor by the second data.

According to an embodiment, the current amount calculator calculates the compensation current amount using the age information and the first data.

According to an embodiment, the current amount calculator calculates the compensation current amount using the second data input from the data changer.

According to an embodiment, the plurality of pixels is divided into a plurality of blocks including at least two or more pixels, and the afterimage compensator accumulates the age information in units of the block.

According to an embodiment, the afterimage compensator includes a position determiner configured to generate position information by determining a position of the first data corresponding to the blocks, a data changer configured to generate the second data based on block unit age information and the first data, a representative value generator configured to generate a representative value of the second data in units of the block, a current amount calculator configured to generate a block compensation scale factor based on an initial current amount corresponding to the first data and a compensation current amount corresponding to the second data in units of the block, a controller configured to generate the third data based on the block compensation scale factor and the representative value, and an age accumulator configured to accumulate the third data as the age information.

According to an embodiment, the representative value generator generates the representative value by averaging the second data in units of the block.

According to an embodiment, the current amount calculator generates the block compensation scale factor using a ratio of the initial current amount and the compensation current amount in units of the block.

According to an embodiment, the current amount calculator calculates the compensation current amount using the block unit age information and the first data.

According to an embodiment, the current amount calculator calculates the compensation current amount in units of the block using the second data input from the data changer.

According to embodiments of the disclosure, a method of driving a display device including a plurality of pixels, each pixel including a driving transistor and a light emitting element, includes generating first data by correcting input data in correspondence with at least one of optical measurement information, a threshold voltage of each of the driving transistors, mobility information, dimming information, and temperature information, generating second data based on age information of the light emitting element and the first data, generating third data based on a current amount corresponding to the first data and a current amount corresponding to the second data, and generating the age information by accumulating the third data.

According to an embodiment, the pixels are divided into a plurality of blocks that include at least two or more of the pixels, and the age information is generated in units of a block.

According to an embodiment, the method further includes determining a position of the block among the plurality of blocks including the first data.

According to an embodiment, the method further includes generating a representative value of the second data in units of the block, and the third data is generated based on the current amount corresponding to the first data and the current amount corresponding to the second data in the representative value in units of the block.

According to an embodiment, the representative value is generated by averaging the second data in units of the block.

According to an embodiment, the method further includes generating a global current value by measuring a current amount flowing through the pixels, generating a scale factor based on the global current value and a load of the input data, generating output data based on the scale factor and the second data, and generating a data signal to be supplied to the pixels using the output data.

In accordance with the display device and the method of driving the same according to embodiments of the disclosure, since the age information is accumulated based on the current amount supplied to the light emitting element and an afterimage of the light emitting element is compensated using the accumulated age information, afterimage compensation ability may be increased.

However, an effect of the disclosure is not limited to the above-described effect, and may be variously expanded without departing from the spirit and scope of the disclosure.

BRIEF DESCRIPTION OF THE DRAWINGS

The above and other features of the disclosure will become more apparent by describing in detail embodiments thereof with reference to the accompanying drawings, in which.

DETAILED DESCRIPTION OF THE EMBODIMENTS

Figure 1:
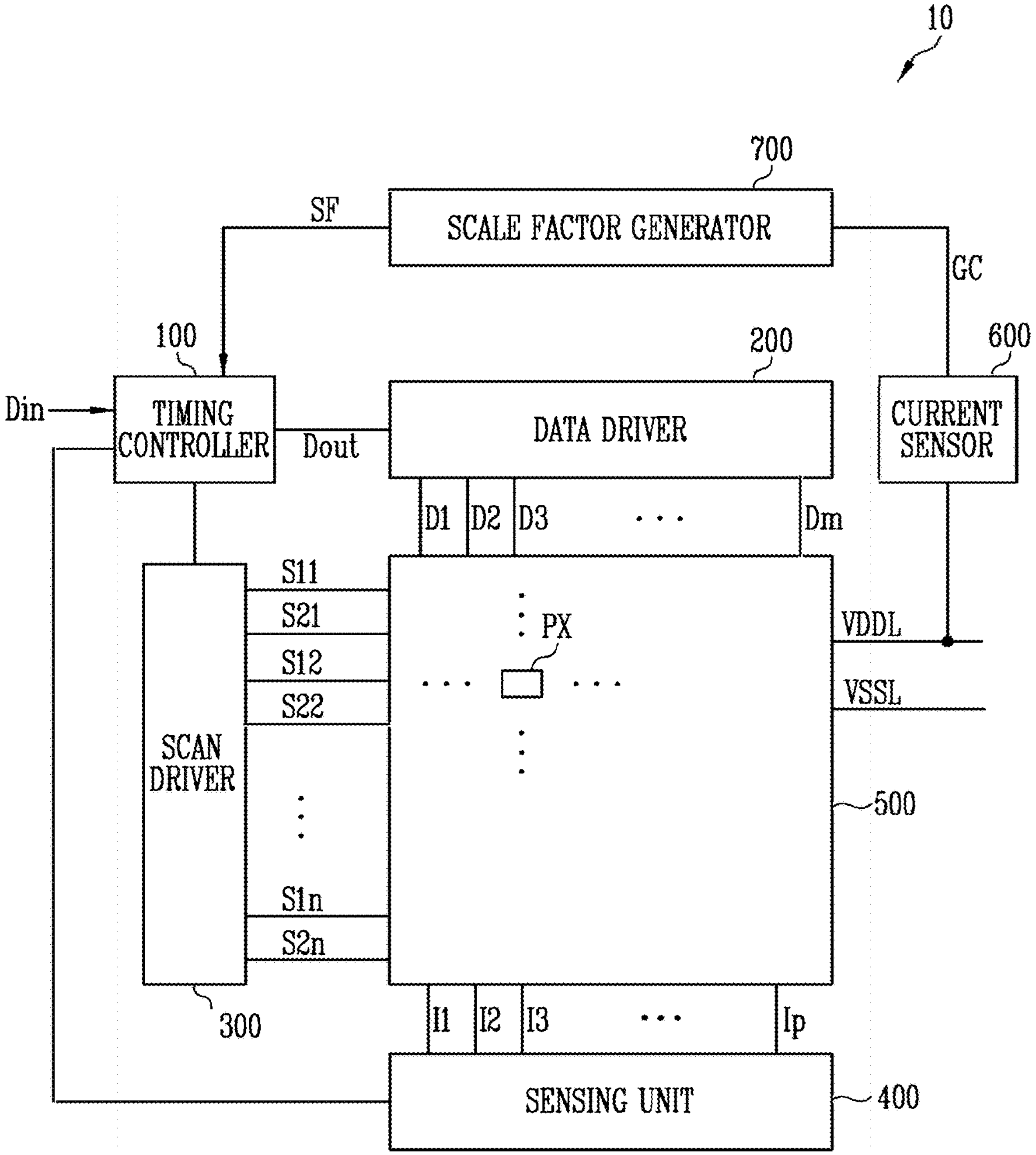
FIG. 1 is a diagram illustrating a display device according to an embodiment of the disclosure.

Embodiments of the disclosure will be described more fully hereinafter with reference to the accompanying drawings. Like reference numerals may refer to like elements throughout the accompanying drawings.

Herein, when two or more elements or values are described as being substantially the same as or about equal to each other, it is to be understood that the elements or values are identical to each other, the elements or values are equal to each other within a measurement error, or if measurably unequal, are close enough in value to be functionally equal to each other as would be understood by a person having ordinary skill in the art. For example, the term "about" as used herein is inclusive of the stated value and means within an acceptable range of deviation for the particular value as determined by one of ordinary skill in the art, considering the measurement in question and the error associated with measurement of the particular quantity (e.g., the limitations of the measurement system). For example, "about" may mean within one or more standard deviations as understood by one of the ordinary skill in the art. Further, it is to be understood that while parameters may be described herein as having "about" a certain value, according to exemplary embodiments, the parameter may be exactly the certain value or approximately the certain value within a measurement error as would be understood by a person having ordinary skill in the art. Other uses of these terms and similar terms to describe the relationships between components should be interpreted in a like fashion.

It will be understood that the terms "first," "second," "third," etc. are used herein to distinguish one element from another, and the elements are not limited by these terms. Thus, a "first" element in an embodiment may be described as a "second" element in another embodiment.

It should be understood that descriptions of features or aspects within each embodiment should typically be considered as available for other similar features or aspects in other embodiments, unless the context clearly indicates otherwise.

As used herein, the singular forms "a", "an" and "the" are intended to include the plural forms as well, unless the context clearly indicates otherwise.

FIG. 1 is a diagram illustrating a display device according to an embodiment of the disclosure.

Referring to FIG. 1, the display device 10 according to an embodiment of the disclosure includes a timing controller 100 (also referred to as a timing controller circuit), a data driver 200 (also referred to as a data driver circuit), a scan driver 300 (also referred to as a scan driver circuit), a sensing unit 400 (also referred to as a sensing unit circuit), a pixel unit 500, a current sensor 600 (also referred to as a current sensor circuit), and a scale factor generator 700 (also referred to as a scale factor generator).

The pixel unit 500 may include pixels PX. Each of the pixels PX may be connected to a corresponding data line and scan line. Here, the pixel PXij (where i and j are positive integers) refer to a pixel connected to an i-th scan line and a j-th data line.

Each of the pixels PX may be connected to a first power line VDDL and a second power line VSSL. The pixels PX may receive first power VDD (shown in FIG. 2) through the first power line VDDL and second power VSS (shown in FIG. 2) through the second power line VSSL. The first power VDD may have a voltage level higher than that of the second power VSS.

The first power line VDDL may be commonly connected to the pixels PX and may supply the first power VDD to the pixels PX. The second power line VSSL may be commonly connected to the pixels PX and may supply the second power VSS to the pixels PX. However, a connection relationship between the power lines VDDL and VSSL and the pixels PX is not limited thereto. In an embodiment, a plurality of first power lines VDDL may be connected to different pixels. In an embodiment, a plurality of second power lines VSSL may be connected to different pixels.

Each of the pixels PX may include a plurality of transistors and at least one light emitting element. The pixels PX may be selected when a scan signal is supplied to a scan line connected thereto, and may receive a data signal from a data line. Each of the pixels PX supplied with the data signal may supply light of a predetermined luminance to the outside of the display device 10 in response to the data signal.

The timing controller 100 may receive input data Din and a control signal. For example, the timing controller 100 may receive the input data Din and the control signal from at least one of an external graphics processing unit (GPU), a central processing unit (CPU), an application processor (AP), and the like. Here, the control signal may include, for example, a synchronization signal, a clock signal, and the like. In addition, the input data Din may have a predetermined grayscale and may be input in a frame unit.

The timing controller 100 may correct the input data Din to generate output data Dout, and supply the generated output data Dout to the data driver 200. In an embodiment, the timing controller 100 may correct the input data Din in response to an optical measurement result measured during a process. In an embodiment, the timing controller 100 may correct the input data Din based on a temperature or the like of the display device 10. In an embodiment, the timing controller 100 may correct the input data Din using a threshold voltage and/or mobility information of a driving transistor included in each of the pixels PX.

Additionally, the timing controller 100 may accumulate age information so that deterioration (or an afterimage) of the light emitting element included in each of the pixels PX may be compensated, and corrects the input data Din using the accumulated information. A detailed description related to this is described below with reference to FIGS. 3 to 7.

The scan driver 300 may supply a first scan signal to first scan lines S11 to S1*n* (where n is a positive integer) and supply a second scan signal to second scan lines S21 to S2*n* in response to the control signal from the timing controller 100.

For example, the scan driver 300 may sequentially supply a first scan signal having a gate-on voltage (or a turn-on level) to the first scan lines S11 to S1*n*. In addition, the scan driver 300 may sequentially supply a second scan signal having a gate-on voltage to the second scan lines S21 to S2*n*. In FIG. 1, one scan driver 300 drives the first scan lines S11 to Sin and the second scan lines S21 to S2*n*. However, embodiments of the disclosure are not limited thereto. For example, in an embodiment, the respective first scan lines S11 to Sin and second scan lines S21 to S2*n* may receive a scan signal from different scan drivers.

When the first scan signal is sequentially supplied, the pixels PX may be selected in a horizontal line unit (or a pixel row unit), and a data signal may be supplied to the selected pixels PX. When the second scan signal is sequentially supplied, the pixels PX are selected in a horizontal line unit, and sensing information (for example, the threshold voltage and/or mobility information) of the driving transistor included in each of the selected pixels PX may be provided to the sensing unit 400.

The data driver 200 may generate the data signal (or a data voltage) using the output data Dout and the control signal supplied from the timing controller 100, and supply the generated data signal to data lines D1 to Dm (where m is a positive integer). The data signal supplied to the data lines D1 to Dm may be supplied to the pixels PX selected by the first scan signal. To this end, the data driver 200 may supply the data signal to the data lines D1 to Dm to be synchronized with the first scan signal.

The sensing unit 400 may supply a voltage of initialization power to sensing lines I1 to Ip (where p is a positive integer) during a period in which an image is displayed by the pixels PX. In addition, the sensing unit 400 may receive the sensing information from at least one sensing line among the sensing lines I1 to Ip while the sensing information is extracted from at least one pixel. Here, the sensing information may include the threshold voltage and/or mobility information of the driving transistor included in the pixel.

The current sensor 600 may be connected to the first power line VDDL commonly connected to the pixels PX. The current sensor 600 may sense a current flowing through the first power line VDDL to generate a global current value GC. The global current value GC generated by the current sensor 600 may be supplied to the scale factor generator 700. Here, the global current value GC may correspond to a current amount supplied to all pixels PX through the first power line VDDL. However, embodiments of the disclosure are not limited thereto. For example, the current sensor 600 may be connected to the second power line VSSL commonly connected to the pixels PX to sense a current flowing through the second power line VSSL.

The scale factor generator 700 may generate a scale factor SF by comparing a target current value and the global current value GC. Here, the target current value may be set in response to a load of the input data Din. The scale factor generator 700 may compare the target current value and the global current value GC, and generate a scale factor SF in response to a comparison result. For example, the scale factor generator 700 may determine a ratio between the target current value and the global current value GC as the scale factor SF.

In an embodiment, when the global current value GC is greater than the target current value, the scale factor generator 700 may determine the scale factor SF so that a grayscale value of the pixels PX is small scaled. In an embodiment, when the global current value GC is less than the target current value, the scale factor generator 700 may determine the scale factor SF so that the grayscale value of the pixels PX is greatly scaled. The above-described driving process may be referred to as global current management (GCM).

The timing controller 100 may generate second data Data2 (shown in FIG. 3) by correcting the input data Din in various methods, and generate the output data Dout by applying the scale factor SF the second data Data2.

Figure 2:
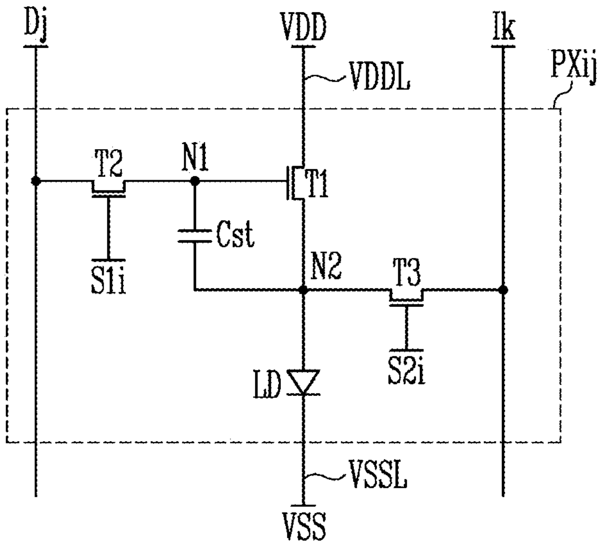
FIG. 2 is a diagram illustrating a pixel according to an embodiment of the disclosure.

FIG. 2 is a diagram illustrating a pixel according to an embodiment of the disclosure. In FIG. 2, a pixel positioned on an i-th horizontal line and a j-th vertical line are shown.

Referring to FIG. 2, the pixel Pxij according to an embodiment may include transistors T1 to T3, a storage capacitor Cst, and a light emitting element LD.

The light emitting element LD may be connected between the first power line VDDL to which the first power VDD is supplied and the second power line VSSL to which the second power VSS is supplied. For example, a first electrode (for example, an anode electrode) of the light emitting element LD may be connected to the first power line VDDL via a second node N2 and the first transistor T1, and a second electrode (for example, a cathode electrode) of the light emitting element LD may be connected to the second power line VSSL. The light emitting element LD may emit light with a luminance corresponding to a driving current supplied from the first transistor T1.

A voltage of the first power VDD and a voltage of the second power VSS may have a predetermined potential difference so that the light emitting element LD emits light. For example, the first power VDD may be high potential power having a high voltage, and the second power VSS may be low potential power having a voltage lower than that of the first power VDD.

The light emitting element LD may be selected as an organic light emitting diode. In addition, the light emitting element LD may be selected as an inorganic light emitting diode such as, for example, a micro light emitting diode (LED) or a quantum dot LED. In addition, the light emitting element LD may be an element in which an organic material and an inorganic material are combined. In an embodiment according to FIG. 2, the pixel PX includes a single light emitting element LD. In an embodiment, the pixel PX may include a plurality of light emitting elements, and the plurality of light emitting elements may be connected in series, in parallel, or in series-parallel with each other.

In an embodiment, the transistors T1, T2, and T3 may be configured as N-type transistors. In an embodiment, the transistors T1, T2, and T3 may be configured as P-type transistors. In an embodiment, the transistors T1, T2, and T3 may be configured as a combination of an N-type transistor and a P-type transistor. The P-type transistor collectively refers to a transistor that conducts and a current amount increases when a voltage difference between a gate electrode and a source electrode increases in a negative direction. The N-type transistor collectively refers to a transistor that conducts and a current amount increases when a voltage difference between a gate electrode and a source electrode increases in a positive direction.

The transistor may be configured in various forms, such as, for example, a thin film transistor (TFT), a field effect transistor (FET), and a bipolar junction transistor (BJT).

The first transistor T1 is connected between the first power line VDDL and the second node N2. A gate electrode of the first transistor T1 is connected to a first node N1. The first transistor T1 controls a current amount supplied from the first power VDD to the second power VSS via the light emitting element LD in response to a voltage of the first node N1. Such a first transistor T1 may be referred to as a driving transistor.

The second transistor T2 is connected between the data line Dj and the first node N1. A gate electrode of the second transistor T2 is connected to a first scan line S1*i*. The second transistor T2 is turned on when a first scan signal is supplied to the first scan line S1*i* to electrically connect the data line Dj and the first node N1.

The third transistor T3 is connected between the second node N2 and a sensing line Ik (where k is a positive integer). A gate electrode of the third transistor T3 is connected to a second scan line S2*i*. The third transistor T3 is turned on when a second scan signal is supplied to the second scan line S2*i* to electrically connect the sensing line Ik and the second node N2.

The storage capacitor Cst is connected between the first node N1 and the second node N2. The storage capacitor Cst stores a voltage corresponding to a difference between the first node N1 and the second node N2.

An operation process performed during a display period according to an embodiment is described below.

First, a first scan signal is supplied to the first scan line S1*i* and a second scan signal is supplied to the second scan line S2*i*.

When the first scan signal is supplied to the first scan line S1*i*, the data line Dj and the first node N1 are electrically connected, and thus, the data signal from the data line Dj is supplied to the first node N1. When the second scan signal is supplied to the second scan line S2*i*, the second node N2 and the sensing line Ik are electrically connected, and thus, the voltage of the initialization power from the sensing line Ik is supplied to the second node N2.

At this time, the storage capacitor Cst stores a voltage corresponding to a difference between the data signal and the initialization power. Here, since the voltage of the initialization power is set to a constant voltage, the voltage stored in the storage capacitor Cst may be determined by a voltage of the data signal.

After the voltage corresponding to the data signal is stored in the storage capacitor Cst, the supply of the first scan signal to the first scan line S1*i* is stopped, and thus, the second transistor T2 is turned off. In addition, the supply of the second scan signal to the second scan line S2*i* is stopped, and thus, the third transistor T3 is turned off. Thereafter, the first transistor T1 supplies a current corresponding to the voltage stored in the storage capacitor Cst to the light emitting element LD, and the light emitting element LD generates light of a predetermined luminance in response to the current amount supplied thereto.

An operation process performed during a sensing period according to an embodiment is described below.

First, the first scan signal is supplied to the first scan line S1*i* and the second scan signal is supplied to the second scan line S2*i*.

When the first scan signal is supplied to the first scan line S1*i*, the data line Dj and the first node N1 are electrically connected, and thus, a voltage of reference power from the data line Dj is supplied to the first node N1. Here, the reference power may be preset so that the first transistor T1 is turned on.

When the second scan signal is supplied to the second scan line S2*i*, the second node N2 and the sensing line Ik are electrically connected, and thus, the voltage of the initialization power from the sensing line Ik is supplied to the second node N2. At this time, the storage capacitor Cst stores a voltage corresponding to a difference between the reference power and the initialization power. Here, the voltage of the reference power and the initialization power is preset to a constant voltage.

Thereafter, the supply of the first scan signal to the first scan line S1*i* is stopped, and thus, the second transistor T2 is turned off. In addition, the supply of the initialization power to the sensing line Ik is stopped, and thus, the sensing line Ik is electrically connected to the sensing unit 400.

In an embodiment, the first transistor T1 supplies the current corresponding to the voltage stored in the storage capacitor Cst to the sensing line Ik via the second node N2. At this time, the sensing unit 400 changes a current supplied to the sensing line Ik or a voltage applied to the sensing line Ik in response to the current to a digital value. The digital value generated by the sensing unit 400 may be supplied to the timing controller 100 as the sensing information.

As described above, the sensing unit 400 may extract the sensing information from the pixels PX and provide the sensing information to the timing controller 100 during the sensing period. Here, the sensing information may include the threshold voltage and/or mobility information of the driving transistor (that is, the first transistor T1) included in each of the pixels PX.

Figure 3:
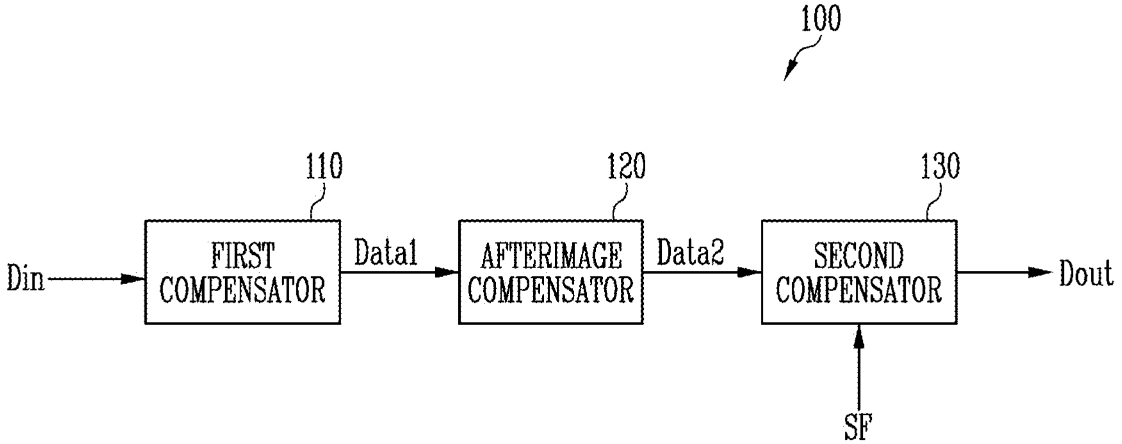
FIG. 3 is a diagram illustrating a timing controller according to an embodiment of the disclosure.

FIG. 3 is a diagram illustrating a timing controller according to an embodiment of the disclosure.

Referring to FIG. 3, for convenience of explanation, a detailed description of certain aspects not necessary for understanding embodiments of the disclosure described may be omitted.

Referring to FIG. 3, the timing controller 100 according to an embodiment of the disclosure includes a first compensator 110 (also referred to as a first compensator circuit), an afterimage compensator 120 (also referred to as an afterimage compensator circuit), and a second compensator 130 (also referred to as a second compensator).

The first compensator 110 may generate first data Data1 by correcting the input data Din. For example, the first compensator 110 may correct the input data Din based on the optical measurement result measured during the process. In an embodiment, the first compensator 110 may correct the input data Din based on the temperature of the display device 10 (or the pixel unit 500). In an embodiment, the first compensator 110 may correct the input data Din based on dimming information. In an embodiment, the first compensator 110 may correct the input data Din to compensate for a threshold voltage and/or mobility of the driving transistor based on the sensing information. That is, the first compensator 110 may generate the first data Data1 by correcting the input data Din using various methods.

The afterimage compensator 120 may generate second data Data2 by correcting the first data Data1 based on age information (or deterioration information) of the light emitting element LD included in each of the pixels PX.

For example, the light emitting element LD included in each of the pixels PX may deteriorate according to the luminance of emitted light and a use time. When the same data signal is supplied, the luminance of the light emitting element LD of a case where the light emitting element LD is deteriorated and the luminance of the light emitting element LD of a case where the light emitting element LD is not deteriorated may be differently set, and thus, display quality may be reduced. For example, when the light emitting element LD is deteriorated, light of a luminance less than a desired luminance may be generated, and thus, an afterimage or the like may be observed by a user.

The afterimage compensator 120 may determine deterioration information of the light emitting element LD included in each of the pixels PX, and generate the second data Data2 by based on the deterioration information and the first data Data1. For example, the afterimage compensator 120 may generate third data Data3 by applying a compensation scale factor CSF (shown in FIG. 4) to the second data Data2, and generate the age information (for example, the deterioration information of the light emitting element) by accumulating the third data Data3. The afterimage compensator 120 may generate the second data Data2 by applying the age information to the first data Data1.

The second compensator 130 may generate the output data Dout based on the scale factor SF and the second data Data2. That is, the second compensator 130 may generate the output data Dout by applying the scale factor SF to the second data Data2 so that a desired current flows in the pixel unit 500.

Figure 4:
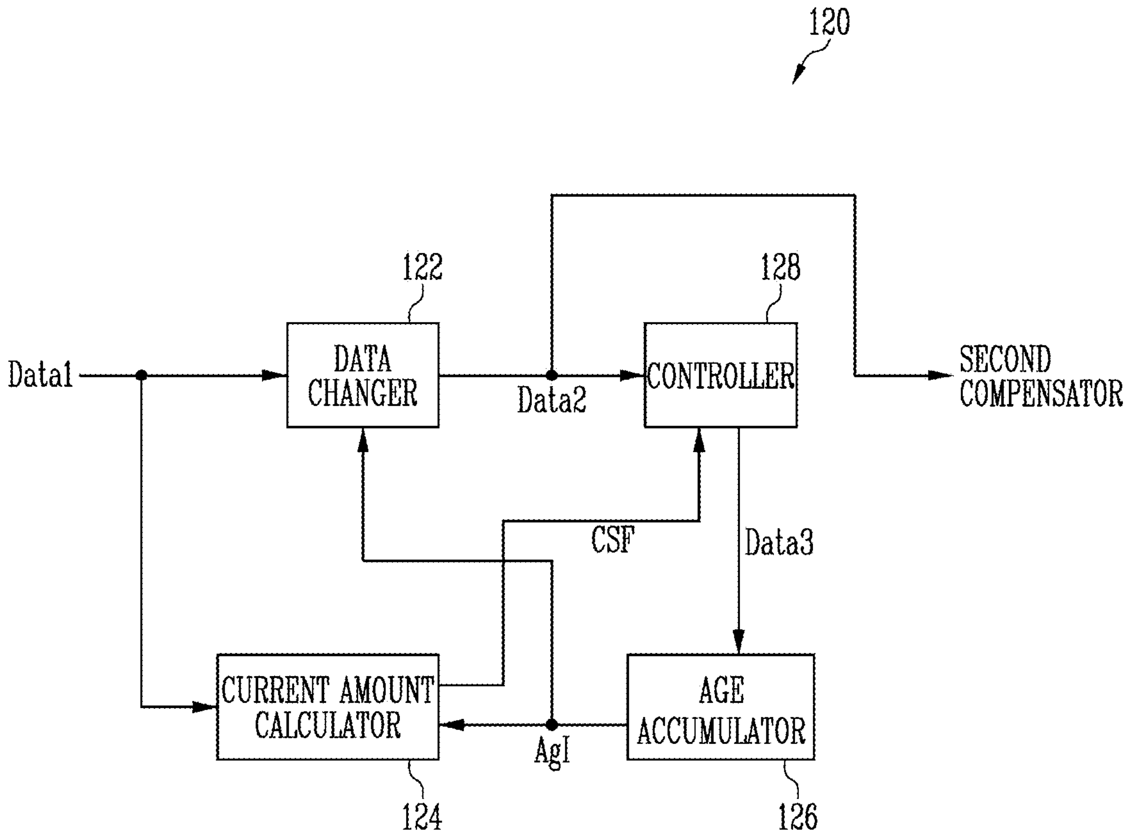
FIG. 4 is a diagram illustrating an embodiment of an afterimage compensator shown in FIG. 3.
Figure 5:
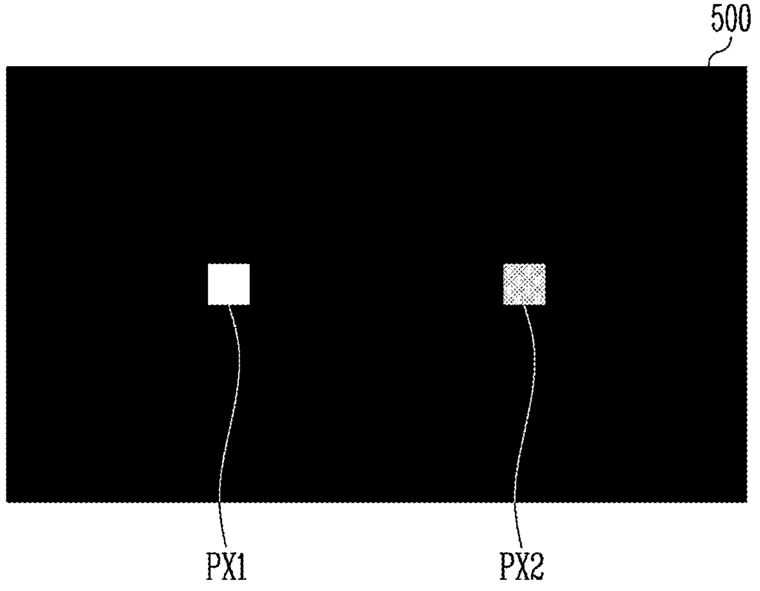
FIG. 5 is a diagram illustrating an operation process of the afterimage compensator shown in FIG. 4 according to an embodiment of the disclosure.

FIG. 4 is a diagram illustrating an embodiment of the afterimage compensator shown in FIG. 3. FIG. 5 is a diagram illustrating an operation process of the afterimage compensator shown in FIG. 4 according to an embodiment of the disclosure.

Referring to FIGS. 4 and 5, the afterimage compensator 120 according to an embodiment of the disclosure includes a data changer 122 (also referred to as a data changer circuit), a current amount calculator 124 (also referred to as a current amount calculator circuit), an age accumulator 126 (also referred to as an age accumulator circuit), and a controller 128 (also referred to as a controller circuit).

The data changer 122 may generate the second data Data2 by correcting the first data Data1 so that the deterioration of the light emitting element LD included in the pixels PX is compensated in response to the age information AgI from the age accumulator 126.

In an embodiment, as shown in FIG. 5, the first data Data1 to be supplied to the first pixel PX1 may correspond to a white grayscale, and the first data Data1 to be supplied to the second pixel PX2 may correspond to a gray grayscale. In addition, black may be displayed in remaining pixels except for the first pixel PX1 and the second pixel PX2. In this case, a current amount of the first pixel PX1 may be set to about 1 A in response to the white grayscale, and a current amount of the second pixel PX2 may be set to about 0.5 A in response to the gray grayscale. Here, the current amounts of about 1 A and about 0.5 A of each of the pixels PX1 and PX2 are examples, and these values are not limited thereto.

The data changer 122 may receive age information AgI of the first pixel PX1 and age information AgI of the second pixel PX2 from the age accumulator 126. Here, the data changer 122 may determine that the light emitting element LD included in the first pixel PX1 is deteriorated by about 20%, and determine that the light emitting element LD included in the second pixel PX2 is deteriorated by about 6%, in response to the age information AgI.

The data changer 122 may generate the second data Data2 by changing the first data Data1 corresponding to the first pixel PX1 so that deterioration of the light emitting element LD included in the first pixel PX1 may be compensated based on the age information AgI. Here, the second data Data2 may be set to allow a current of about 1.2 A to flow based on the deterioration of the light emitting element LD included in the first pixel PX1.

The data changer 122 may generate the second data Data2 by changing the first data Data1 corresponding to the second pixel PX2 so that deterioration of the light emitting element LD included in the second pixel PX2 may be compensated based on the age information AgI. Here, the second data Data2 may be set to allow a current of about 0.53 A to flow based on the deterioration of the light emitting element LD included in the second pixel PX2.

The second data Data2 generated by the data changer 122 may be supplied to the controller 128 and the second compensator 130. The second compensator 130 generates the output data Dout by correcting the second data Data2 using the scale factor SF from the scale factor generator 700. Here, the output data Dout may be generated to compensate for, for example, temperature, threshold and/or mobility of the driving transistor, optics, dimming, deterioration of the light emitting element, and the like. The output data Dout generated by the second compensator 130 may be supplied to the data driver 200, and the data driver 200 may generate the data signal to be supplied to the data lines D1 to Dm using the output data Dout.

Additionally, the scale factor SF generated by the scale factor generator 700 may set a target current value using a load of the input data Din, and the target current value may be set so that a current corresponding to the set target current value may flow in the pixel unit 500. However, when only the load of the input data Din is considered, a compensation degree of the first compensator 110 and the afterimage compensator 120 is not reflected, and thus, a luminance of the pixel unit 500 may not be accurately controlled. Therefore, the scale factor generator 700 may generate the scale factor SF based on various pieces of compensation information including temperature.

The current amount calculator 124 may receive the first data Data1 and the age information AgI, and generate the compensation scale factor CSF in response to the first data Data1 and the age information AgI.

In an embodiment, the current amount calculator 124 may determine an initial current (for example, about 1 A or about 0.5 A) using the first data Data1 to be supplied to the first pixel PX1 and the second pixel PX2. In addition, the current amount calculator 124 may determine an afterimage compensation after current (for example, about 1.2 A or about 0.53 A) after compensating an afterimage in response to the age information AgI of the first pixel PX1 and the second pixel PX2.

Here, when all remaining pixels except for the first pixel PX1 and the second pixel PX2 are set to black, the initial current of the pixel unit 500 by the first data Data1 may be set to about 1.5 A. In addition, the afterimage compensation after current of the pixel unit 500 by the second data Data2 may be set to about 1.73 A. The current amount calculator 124 may generate the compensation scale factor CSF using a ratio of the initial current and the afterimage compensation after current. For example, the current amount calculator 124 may generate the compensation scale factor CSF of about 0.87 by dividing the initial current of about 1.5 A by the afterimage compensation after current of about 1.73 A. The compensation scale factor CSF may be supplied to the controller 128.

The controller 128 receives the second data Data2 and the compensation scale factor CSF, and generates the third data Data3 by applying the compensation scale factor CSF to the second data Data2.

For example, the controller 128 may generate the third data Data3 by multiplying the second data Data2 by the compensation scale factor CSF. For example, the second data Data2 corresponding to the first pixel PX1 may correspond to a current of about 1.2 A, and the second data Data2 corresponding to the second pixel PX2 may correspond to a current of about 0.53 A. Here, when 1.2 A is multiplied by 0.87, a compensation scale factor CSF compensation after current, that is, the third data Data3 corresponding to the first pixel PX1 may correspond to a current of about 1.04 A. In addition, when 0.53 A is multiplied by 0.87, the compensation scale factor CSF compensation after current, that is, the current of the third data Data3 corresponding to the second pixel PX2 may correspond to about 0.46 A. A current of the pixel unit 500 corresponding to the third data Data3 may be about 1.5 A, and may be set to be the same as the initial current of the pixel unit 500 corresponding to the first data Data1.

The third data Data3 generated by the controller 128 is provided to the age accumulator 126. The controller 128 may accumulate and store the third data Data3 corresponding to the first pixel PX1 as the age information AgI of the first pixel PX1. The controller 128 may accumulate and store the third data Data3 corresponding to the second pixel PX2 as the age information AgI of the second pixel PX2.

The third data Data3 may be described as in Equation 1.

$$\text{Data3}=(\text{Data1}+\text{afterimage compensation amount})\times\text{CSF} \qquad \text{[Equation 1]}$$

In Equation 1, a value obtained by adding the afterimage compensation amount to the first data Data1 may be the second data Data2, and a value obtained by multiplying the second data Data2 by the compensation scale factor CSF may be set as the third data Data3. In addition, the age information AgI may be generated by accumulating the third data Data3.

When the age accumulator 126 accumulates the third data Data3 to generate the age information AgI, a current amount actually flowing to the light emitting element LD of each of the pixels PX may be taken into account, and thus, reliability of the age information AgI may be increased. In addition, since the deterioration of the light emitting element LD is compensated using the reliable age information AgI, an afterimage compensation ability may be increased.

Referring to a comparative example, the age accumulator 126 may accumulate the age information AgI of the pixels PX using the second data Data2. Here, the second data Data2 is data to which the scale factor SF is not applied, and when the age information AgI is accumulated using the second data Data2, the current amount actually flowing to the light emitting element LD is not reflected.

Referring to another comparative example, the controller 18 may generate the third data by applying the scale factor SF instead of the compensation scale factor CSF, and accumulate the age information AgI using the third data. Here, the scale factor SF may be generated in response to the load of the input data Din, and may be generated based on additional various pieces of information such as temperature. The second data Data2 supplied to the controller 128 is data to which various pieces of information such as temperature is reflected. When the third data is generated using the scale factor SF, various pieces of information such as temperature is reflected to the third data in plurality, and thus, the current amount actually flowing to the light emitting element LD is not reflected.

Therefore, in an embodiment of the disclosure, since the compensation scale factor CSF is generated so that only deterioration compensation information is reflected, and the third data Data3 is generated based on the compensation scale factor CSF, the age information AgI may be generated based on the actual current amount supplied to the light emitting element LD.

In an embodiment of the disclosure, each of the data changer 122, the current amount calculator 124, the age accumulator 126, and the controller 128 may be implemented in software and/or hardware. In an embodiment, at least a partial configuration of each of the data changer 122, the current amount calculator 124, the age accumulator 126, and the controller 128 may be implemented in software and/or hardware. In addition, in the above description, the first compensator 110, the afterimage compensator 120, and the second compensator 130 are positioned inside the timing controller 100. However, embodiments of the disclosure are not limited thereto. For example, at least a partial configuration of the first compensator 110, the afterimage compensator 120, and the second compensator 130 may be positioned outside the timing controller 100. For example, the timing controller 100 may be implemented in an integrated circuit (IC) integrated to include at least a partial configuration of the first compensator 110, the afterimage compensator 120, and the second compensator 130. Similarly, the scale factor generator 700 may also be implemented in an IC integrated and positioned inside the timing controller 100.

Figure 6:
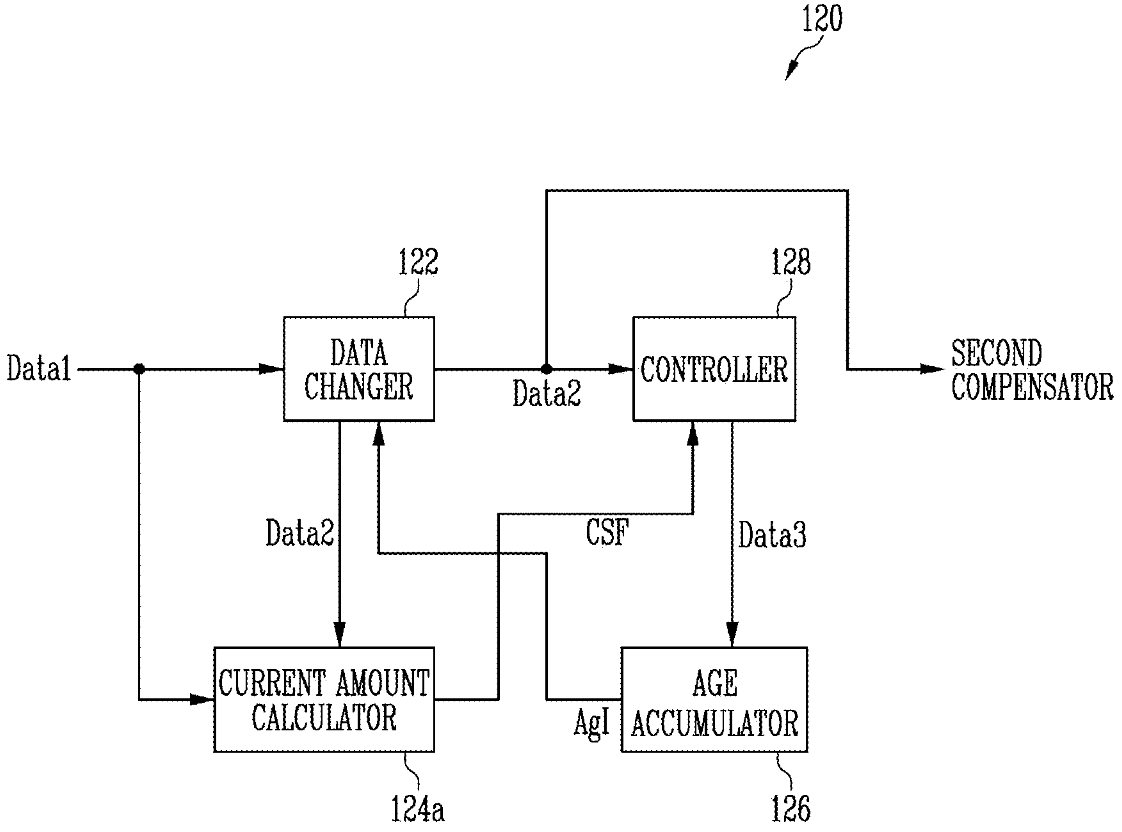
FIG. 6 is a diagram illustrating an afterimage compensator according to an embodiment of the disclosure.

FIG. 6 is a diagram illustrating an afterimage compensator according to an embodiment of the disclosure. When describing FIG. 6, the same reference numerals are assigned to the same configurations as those of FIG. 4, and a further description of components and technical aspects previously described is omitted.

Referring to FIGS. 5 and 6, the afterimage compensator 120 according to an embodiment of the disclosure includes the data changer 122, a current amount calculator 124*a*, the age accumulator 126, and the controller 128.

The current amount calculator 124*a* may receive the first data Data1 and the second data Data2, and generate the compensation scale factor CSF corresponding to the first data Data1 and the second data Data2.

In an embodiment, the current amount calculator 124*a* may determine the initial current (for example, about 1 A or about 0.5 A) using the first data Data1 to be supplied to the first pixel PX1 and the second pixel PX2. In addition, the current amount calculator 124 may determine the afterimage compensation after current (for example, about 1.2 A or about 0.53 A) using the second data Data2 corresponding to the first pixel PX1 and the second pixel PX2.

Thereafter, the current amount calculator 124*a* may generate the compensation scale factor CSF using the ratio of the initial current and the afterimage compensation after current. In an embodiment of the disclosure, the current amount calculator 124*a* determines the afterimage compensation after current using the second data Data2 instead of the age information AgI, and other practical operation processes are the same as those described with reference to FIG. 4.

In an embodiment, the afterimage compensator 120 of FIGS. 4 and 6 accumulates the age information AgI in units of the pixel. However, embodiments of the disclosure are not limited thereto. For example, in an embodiment, when the age information AgI is accumulated in units of the pixel, an operation amount of the current amount calculator 124 and the controller 128 may be increased. In addition, when the age information AgI is accumulated in units of the pixel, an amount of memory included in the age accumulator 126 may be increased. Accordingly, in an embodiment of the disclosure, the age information AgI may be accumulated by dividing the pixel unit 500 into a plurality of blocks.

Figure 7:
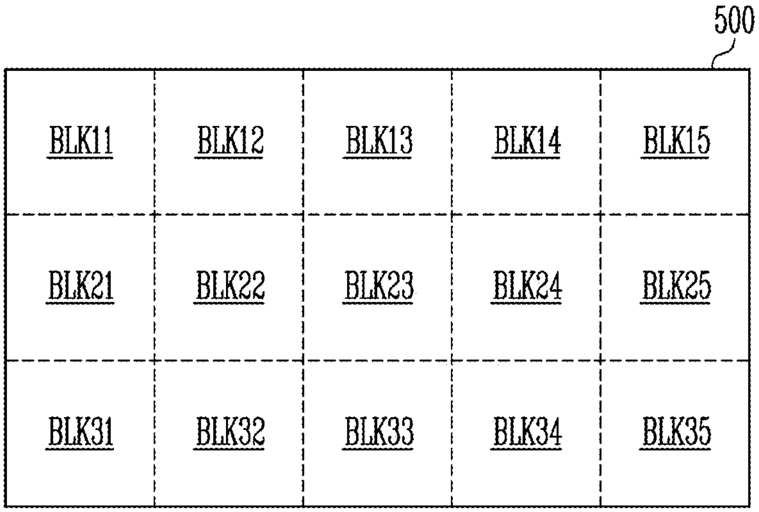
FIG. 7 is a diagram illustrating a pixel unit according to an embodiment of the disclosure.

FIG. 7 is a diagram illustrating a pixel unit according to an embodiment of the disclosure.

Referring to FIG. 7, the pixel unit 500 may be partitioned into a plurality of blocks BLK11, BLK12, BLK13, BLK14, BLK15, BLK21, BLK22, BLK23, BLK24, BLK25, BLK31, BLK32, BLK33, BLK34, and BLK35. Each of the blocks BLK11 to BLK35 may be partitioned to include at least two or more pixels.

In an embodiment, each of the blocks BLK11 to BLK35 may be partitioned to have the same size, and thus each of the blocks BLK11 to BLK35 may include the same number of pixels. However, this is an example, and embodiments of the disclosure are not limited thereto. For example, according to embodiments, the blocks BLK11 to BLK35 may share at least one pixel, and a portion of the blocks BLK11 to BLK35 may include a pixel of the number different from that of other blocks.

In an embodiment, in FIG. 7, the pixel unit 500 is partitioned into 15 blocks BLK11 to BLK35. However, embodiments of the disclosure are not limited thereto. For example, the pixel unit 500 may be variously partitioned to include at least two blocks.

The afterimage compensator 120 may accumulate the age information AgI in units of the blocks BLK11 to BLK35. For example, the afterimage compensator 120 may extract a representative value from each of the blocks BLK11 to BLK35 and accumulate the age information AgI using the representative value. In this case, the age information AgI may be accumulated corresponding to the blocks BLK11 to BLK35 included in the pixel unit 500, and thus, the operation amount and a memory capacity of the afterimage compensator 120 may be reduced.

Figure 8A:
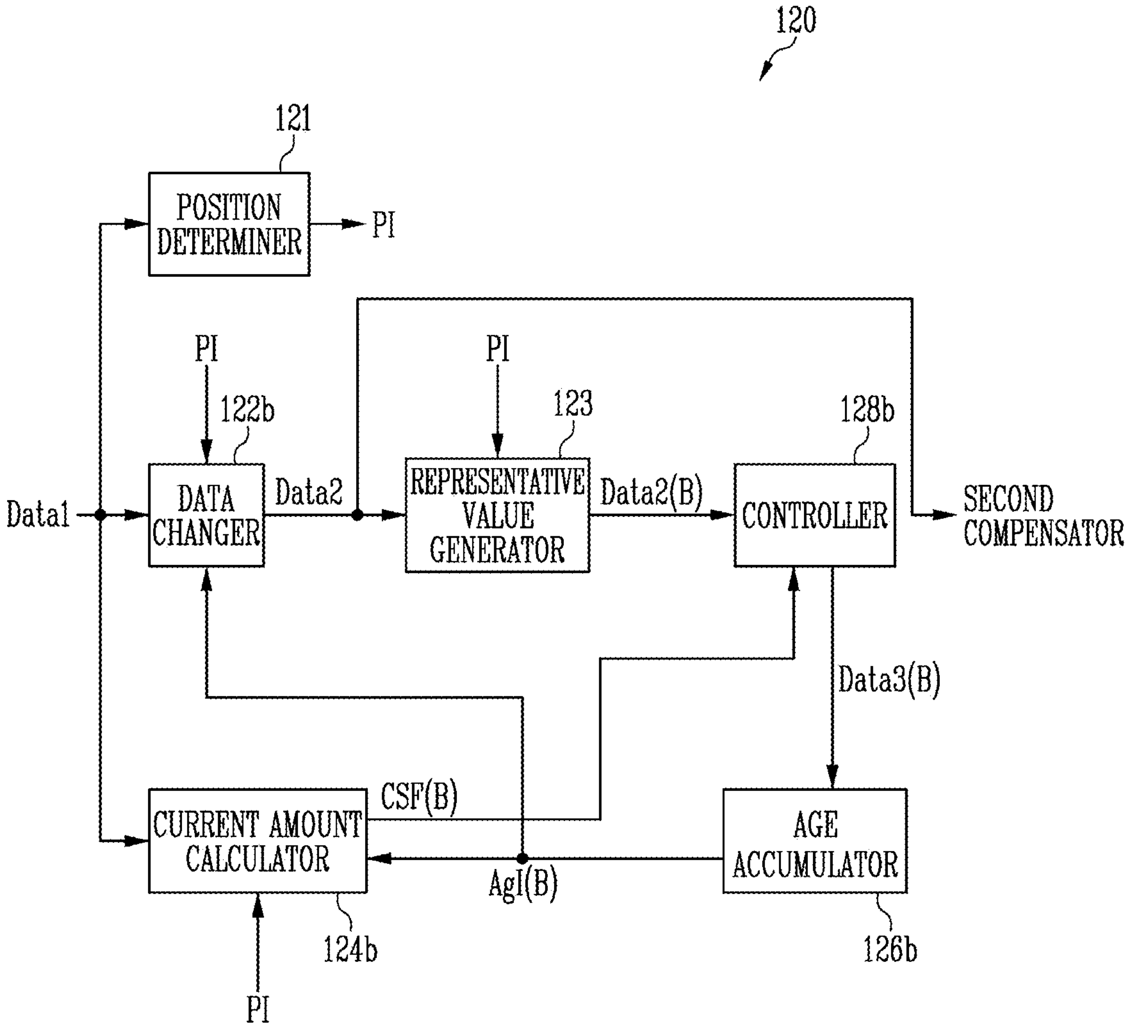
FIGS. 8A and 8B are diagrams illustrating an afterimage compensator according to an embodiment of the disclosure.
Figure 8B:
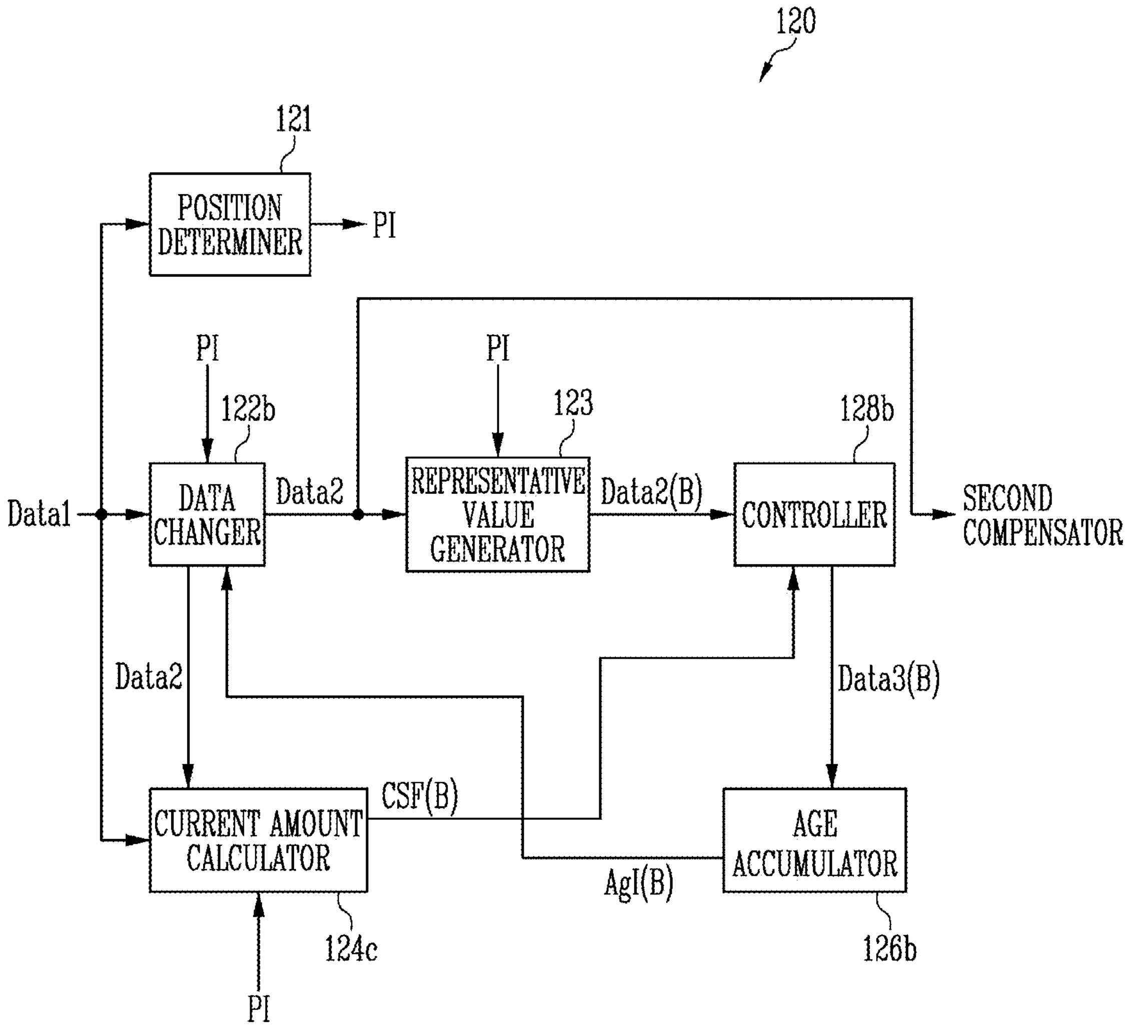
Figure 9:
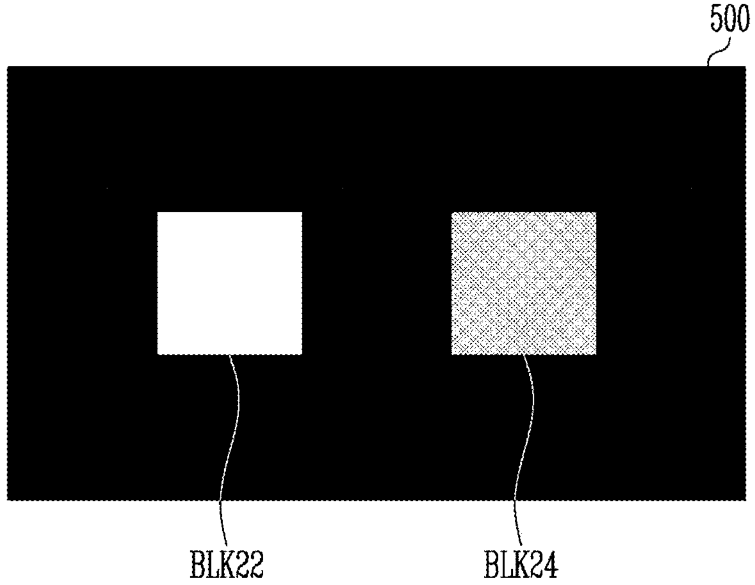
FIG. 9 is a diagram illustrating an operation process of the afterimage compensator shown in FIGS. 8A and 8B according to an embodiment of the disclosure.

FIGS. 8A and 8B are diagrams illustrating an afterimage compensator according to an embodiment of the disclosure. FIG. 9 is a diagram illustrating an operation process of the afterimage compensator shown in FIGS. 8A and 8B according to an embodiment of the disclosure.

Compared to the afterimage compensator of FIG. 4, the afterimage compensator of FIGS. 8A and 8B stores the age information in units of a block. A practical operation process may be similar or identical to that of the afterimage compensator of FIG. 4. Accordingly, a further description of components and technical aspects previously described may be omitted.

Referring to FIGS. 8A and 9, the afterimage compensator 120 according to still an embodiment of the disclosure includes a position determiner 121 (also referred to as a position determiner circuit), a data changer 122*b* (also referred to as a data changer circuit), a representative value generator 123 (also referred to as a representative value generator circuit), a current amount calculator 124*b* (also referred to as a current amount calculator circuit), an age accumulator 126*b* (also referred to as an age accumulator circuit), and a controller 128*b* (also referred to as a controller circuit).

The position determiner 121 may receive the first data Data1 and generate position information PI of the received first data Data1. For example, the position determiner 121 may determine a position of a block (any one of BLK11 to BLK35) to which the currently input first data Data1 belongs. The position information PI generated by the position determiner 121 may be supplied to the data changer 122*b*, the representative value generator 123, and the current amount calculator 124*b*. Additionally, the position information PI may also be supplied to the controller 128*b* and the age accumulator 126*b*.

The data changer 122*b* may receive block age information AgI(B) from the age accumulator 126*b*, and generate the second data Data2 by correcting the first data Data1 so that the deterioration of the light emitting element LD included in the pixels PX may be compensated in response to the block age information AgI(B). Here, deterioration of the first data Data1 belonging to the same block (any one of BLK11 to BLK35) may be compensated for by the same block age information AgI(B).

For example, as shown in FIG. 9, a white grayscale may be displayed on a twenty-second block BLK22 and a gray grayscale may be displayed on a twenty-fourth block BLK24. In addition, black may be displayed in remaining blocks BLK11 to BLK21, BLK23, and BLK25 to BLK35 except for the twenty-second block BLK22 and the twenty-fourth block BLK24. In this case, a current amount of the twenty-second block BLK22 corresponding to the white grayscale may be set to about 10 A, and a current amount of the twenty-fourth block BLK24 corresponding to the gray grayscale may be set to about 5 A. Here, the current amounts of about 10 A and about 5 A of each of the blocks BLK22 and BLK24 are an example, and the current amounts of the actual blocks BLK22 and BLK24 are not limited thereto.

The data changer 122*b* may receive the block age information AgI(B) corresponding to each of the blocks BLK11 to BLK35 from the age accumulator 126*b*. The data changer 122*b* may determine that light emitting elements LD included in the twenty-second block BLK22 are deteriorated by about 20% in response to the block age information AgI(B) of the twenty-second block BLK22, and determine that light emitting elements LD included in the twenty-fourth block BLK24 are deteriorated by about 6% in response to the block age information AgI(B) of the twenty-fourth block BLK24.

The data changer 122*b* may generate the second data Data2 by changing the first data Data1 to be supplied to the twenty-second block BLK22 so that the deterioration of the light emitting elements LD may be compensated using the block age information AgI(B) and the position information PI. Here, the second data Data2 corresponding to the twenty-second block BLK22 may be set to allow a current of about 12 A to flow to compensate for the deterioration of the light emitting element LD.

The data changer 122*b* may generate the second data Data2 by changing the first data Data1 to be supplied to the twenty-fourth block BLK24 so that the deterioration of the light emitting elements LD may be compensated using the block age information AgI(B) and the position information PI. Here, the second data Data2 corresponding to the twenty-fourth block BLK24 may be set to allow a current of about 5.3 A to flow to compensate for the deterioration of the light emitting element LD.

The second data Data2 generated by the data changer 122*b* may be supplied to the second compensator 130 and the representative value generator 123. The second compensator 130 generates the output data Dout by correcting the second data Data2 using the scale factor SF from the scale factor generator 700.

The representative value generator 123 may generate a representative value Data2(B) of the second data Data2 in units of the blocks BLK11 to BLK35. For example, the representative value generator 123 may generate the representative value Data2(B) by averaging the second data Data2 in units of the blocks BLK11 to BLK35. However, embodiments of the disclosure are not limited thereto, and the representative value Data2(B) may be generated using various methods.

The current amount calculator 124*b* may generate a block compensation scale factor CSF(B) using the first data Data1, the position information PI, and the block age information AgI(B). In an embodiment, as shown in FIG. 8B, the current amount calculator 124*c* may generate the block compensation scale factor CSF(B) using the first data Data1, the position information PI, and the second data Data2.

In an embodiment, the current amount calculator 124 may determine the initial current amount (for example, about 10 A or about 5 A) in units of the block using the first data Data1. In addition, the current amount calculator 124 may determine the afterimage compensation after current (for example, about 12 A or about 5.3 A) in units of the block after afterimage compensation (that is, deterioration compensation) using the block age information (AgI(B)).

In an embodiment, the current amount calculator 124 may determine the initial current amount (for example, about 10 A or about 5 A) in units of the block using the first data Data1. In addition, the current amount calculator 124 may determine the afterimage compensation after current (for example, about 12 A or about 5.3 A) in units of the block using the second data Data2.

The initial current of the pixel unit 500 by the first data Data1 supplied to the twenty-second block BLK22 and the twenty-fourth block BLK24 may be set to about 15 A, and the afterimage compensation after current (that is, the current by the second data Data2) may be set to about 17.3 A. The current amount calculator 124*b* may generate the block compensation scale factor CSF(B) using the ratio of the initial current and the afterimage compensation after current. For example, the current amount calculator 124*b* may generate a block compensation scale factor CSF(B) of about 0.87 by dividing the initial current (about 15 A) by the afterimage compensation after current (about 17.3 A). The block compensation scale factor CSF(B) may be supplied to the controller 128*b*.

The controller 128*b* may receive the representative value Data2(B) and the block compensation scale factor CSF(B), and generate the third data Data3(B) by applying the block compensation scale factor CSF(B) to the representative value Data2(B).

For example, the controller 128*b* may generate the third data Data3(B) by multiplying the representative value Data2 (B) by the block compensation scale factor CSF(B). Here, since each of the blocks BLK11 to BLK35 has the representative value Data2(B), the third data Data3(B) may be generated in correspondence with each of the blocks BLK11 to BLK35.

The third data Data3(B) generated by the controller 128*b* is provided to the age accumulator 126*b*. The controller 120*b* may store the age information AgI(B) for each block by accumulating the third data Data3(B) corresponding to each of the blocks BLK11 to BLK35.

The third data Data3(B) corresponding to the number of blocks BLK11 to BLK35 may be generated by the controller 128*b* in the afterimage compensator 120 of FIGS. 8A and 8B described above, and thus, an operation amount may be reduced. In addition, the age accumulator 126*b* may store the block age information AgI(B) corresponding to the number of blocks BLK11 to BLK35, and thus, the memory capacity may be reduced.

Figure 10:
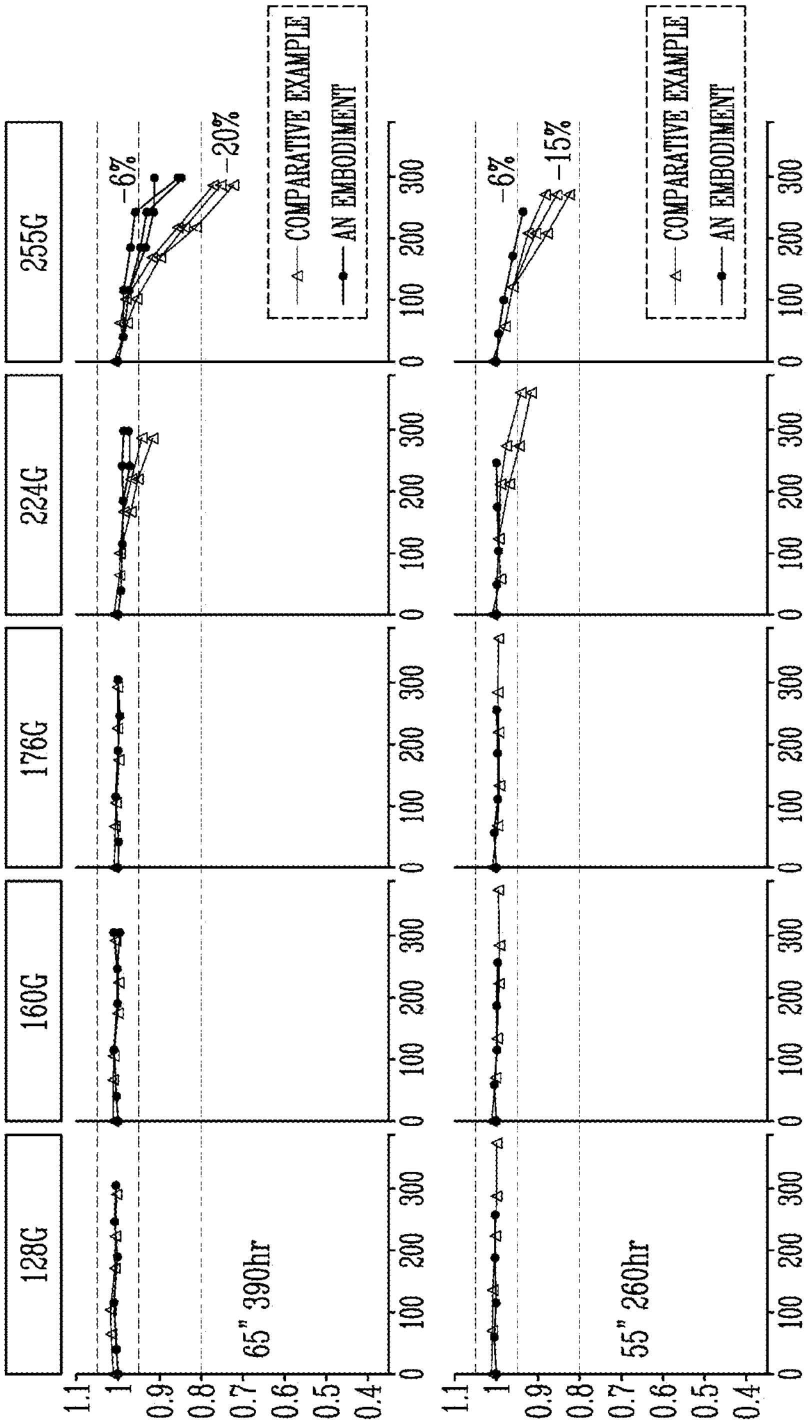
FIG. 10 is a diagram illustrating a simulation result of a display device according to an embodiment of the disclosure.

FIG. 10 is a diagram illustrating a simulation result of a display device according to an embodiment of the disclosure. FIG. 10 illustrates a simulation result of 65-inch and 55-inch display devices 10. In addition, FIG. 10 illustrates a case in which the display device 10 displays an image mainly at a high grayscale (for example, 255 grayscale) so that the light emitting element LD may be rapidly deteriorated.

Referring to FIG. 10, when the 65-inch display device 10 is driven for 390 hours, in the comparative example (for example, the case in which an age is accumulated using the second data Data2 in FIG. 4), light may be emitted with a luminance of about 80% in a case where it is assumed that the initial luminance is 100%. On the other hand, in a case of the display device 10 to which the afterimage compensator 120 of an embodiment of the disclosure is applied, when it is assumed that the initial luminance of the pixel unit 500 is 100%, light is emitted with a luminance of about 94%.

In addition, when the 55-inch display device 10 is driven for 260 hours, in the comparative example, light may be emitted with a luminance of about 85% in a case where it is assumed that the initial luminance is 100%. On the other hand, in a case of the display device 10 to which the afterimage compensator 120 of an embodiment of the disclosure is applied, when it is assumed that the initial luminance of the pixel unit 500 is 100%, light is emitted with a luminance of about 94%.

That is, the afterimage compensating ability (or deterioration compensating ability) of the light emitting element LD may be increased according to embodiments of the disclosure which utilize the afterimage compensator 120.

Figure 11:
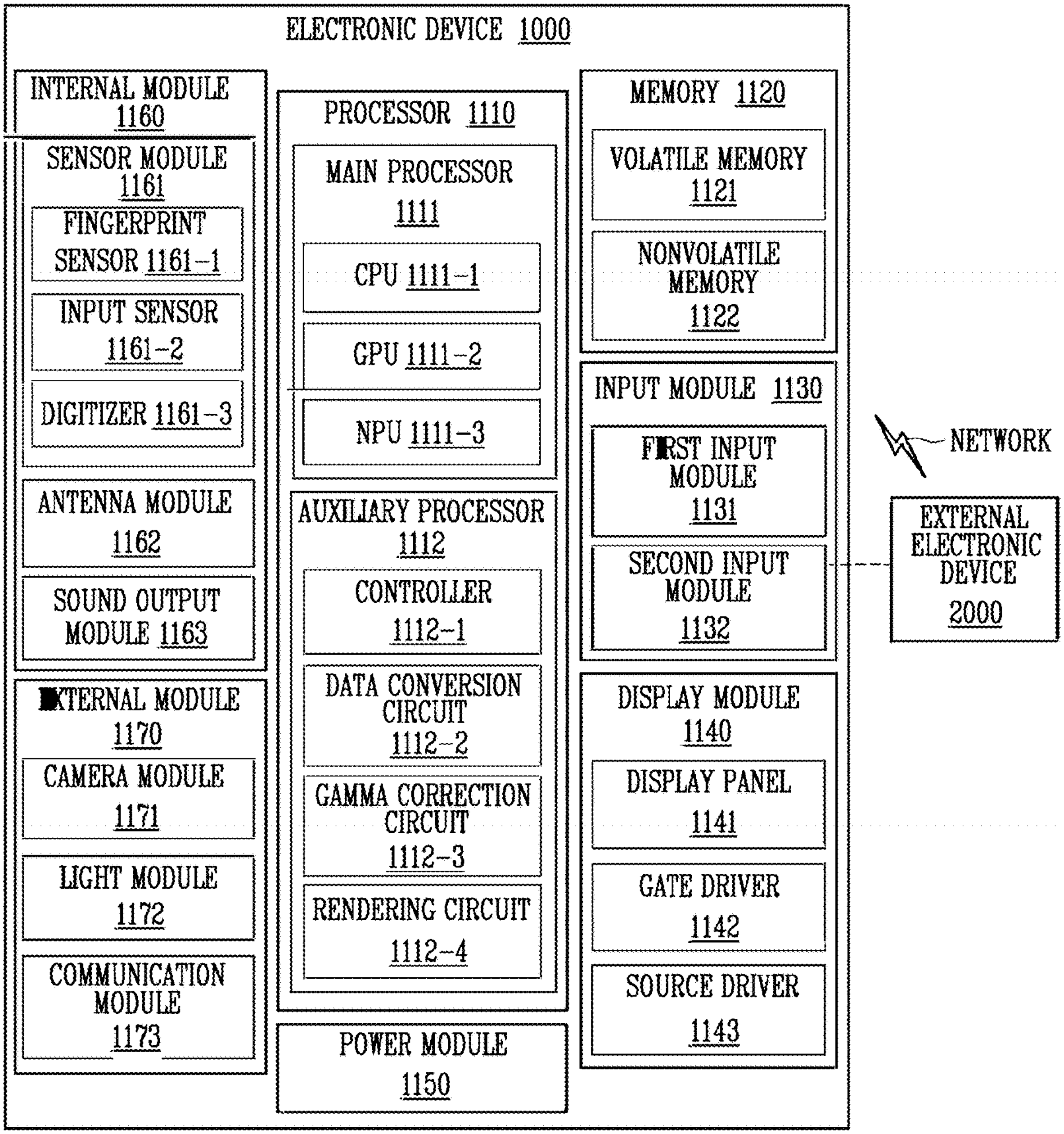
FIG. 11 is a diagram illustrating an electronic device according to an embodiment of the disclosure.

FIG. 11 is a diagram illustrating an electronic device according to an embodiment of the disclosure.

Referring to FIG. 11, the electronic device 1000 outputs various pieces of information through a display module 1140. The display module 1140 may correspond to at least a portion of the display device 10 of FIG. 1. When a processor 1110 executes an application stored in a memory 1120, the display module 1140 provides application information to a user through a display panel 1141. The display panel 1141 may be a configuration corresponding to the pixel unit 500 of FIG. 1.

The processor 1110 obtains an external input through an input module 1130 or a sensor module 1161 and executes an application corresponding to the external input. For example, when the user selects a camera icon displayed on the display panel 1141, the processor 1110 obtains a user input through an input sensor 1161-2 and activates a camera module 1171. The processor 1110 transmits image data corresponding to a captured image obtained through the camera module 1171 to the display module 1140. The display module 1140 may display an image corresponding to the captured image through the display panel 1141.

In an embodiment, when personal information authentication is executed in the display module 1140, a fingerprint sensor 1161-1 obtains input fingerprint information as input data. The processor 1110 compares input data obtained through the fingerprint sensor 1161-1 with authentication data stored in a memory 1120 and executes an application according to a comparison result. The display module 1140 may display information executed according to a logic of the application through the display panel 1141.

In an embodiment, when a music streaming icon displayed on the display module 1140 is selected, the processor 1110 obtains a user input through the input sensor 1161-2 and activates a music streaming application stored in the memory 1120. When a music execution command is input in the music streaming application, the processor 1110 activates a sound output module 1163 to provide sound information corresponding to the music execution command to the user.

An operation of the electronic device 1000 according to an embodiment is briefly described above. Hereinafter, a configuration of the electronic device 1000 is described in further detail. Some of configurations of the electronic device 1000 to be described below may be integrated and provided as one configuration, and one configuration may be separated into two or more configurations and provided.

The electronic device 1000 may communicate with an external electronic device 2000 through a network (for example, a short-range wireless communication network or a long-range wireless communication network). According to an embodiment, the electronic device 1000 may include a processor 1110, a memory 1120, an input module 1130, a display module 1140, a power module 1150, an internal module 1160, and an external module 1170. According to an embodiment, in the electronic device 1000, at least one of the above-described components may be omitted or one or more other components may be added. According to an embodiment, some of the above-described components (for example, the sensor module 1161, an antenna module 1162, or the sound output module 1163) may be integrated into another component (for example, the display module 1140).

The processor 1110 may execute software to control at least another component (for example, a hardware or software component) of the electronic device 1000 connected to the processor 1110, and perform various data processing or operations. According to an embodiment, as at least a portion of the data processing or operation, the processor 1110 may store a command or data received from another component (for example, the input module 1130, the sensor module 1161, or a communication module 1173) in a volatile memory 1121 and process the command or the data stored in the volatile memory 1121, and result data may be stored in a nonvolatile memory 1122.

The processor 1110 may include a main processor 1111 and an auxiliary processor 1112. The auxiliary processor 1112 may correspond to the timing controller 100 of FIG. 1.

The main processor 1111 may include one or more of a central processing unit (CPU) 1111-1 or an application processor (AP). The main processor 1111 may further include any one or more of a graphic processing unit (GPU) 1111-2, a communication processor (CP), and an image signal processor (ISP). The main processor 1111 may further include a neural processing unit (NPU) 1111-3. The NPU is a processor specialized in processing an artificial intelligence model, and the artificial intelligence model may be generated through machine learning. The artificial intelligence model may include a plurality of artificial neural network layers. The artificial neural network may be one of, for example, a deep neural network (DNN), a convolutional neural network (CNN), a recurrent neural network (RNN), a restricted Boltzmann machine (RBM), a deep belief network (DBN), a bidirectional recurrent deep neural network (BRDNN), a deep Q-network, or a combination of two or more of the above, but is not limited thereto. Additionally or alternatively, the artificial intelligence model may include a software structure in addition to a hardware structure. At least two of the above-described processing units and processors may be implemented as one integrated configuration (for example, a single chip), or each may be implemented as an independent configuration (for example, a plurality of chips).

The auxiliary processor 1112 may include a controller 1112-1. The controller 1112-1 may include an interface conversion circuit and a timing control circuit. The controller 1112-1 receives an image signal from the main processor 1111, converts a data format of the image signal to correspond to an interface specification with the display module 1140, and outputs image data. The controller 1112-1 may output various control signals utilized for driving the display module 1140.

The auxiliary processor 1112 may further include a data conversion circuit 1112-2, a gamma correction circuit 1112-3, a rendering circuit 1112-4, and the like. The data conversion circuit 1112-2 may receive the image data from the controller 1112-1, compensate the image data to display an image with a desired luminance according to a characteristic of the electronic device 1000, a setting of the user, or the like, or convert the image data for reduction of power consumption, afterimage compensation, or the like. For example, the data conversion circuit 1112-2 may include the first compensator 110, the afterimage compensator 120, and the second compensator 130 shown in FIG. 3.

The gamma correction circuit 1112-3 may convert the image data, a gamma reference voltage, or the like so that the image displayed on the electronic device 1000 has a desired gamma characteristic. The rendering circuit 1112-4 may receive the image data from the controller 1112-1 and render the image data in consideration of a pixel disposition or the like of the display panel 1141 applied to the electronic device 1000. At least one of the data conversion circuit 1112-2, the gamma correction circuit 1112-3, and the rendering circuit 1112-4 may be integrated into another component (for example, the main processor 1111 or the controller 1112-1). At least one of the data conversion circuit 1112-2, the gamma correction circuit 1112-3, and the rendering circuit 1112-4 may be integrated into a source driver 1143 to be described below.

The memory 1120 may store various data used by at least one component (for example, the processor 1110 or the sensor module 1161) of the electronic device 1000, and input data or output data for a command related thereto. The memory 1120 may include at least one of the volatile memory 1121 and the nonvolatile memory 1122.

The input module 1130 may receive a command or data to be used by a component (for example, the processor 1110, the sensor module 1161, or the sound output module 1163) of the electronic device 1000 from outside of the electronic device 1000 (e.g., from the user or the external electronic device 2000).

The input module 1130 may include a first input module 1131 to which a command or data is input from the user and a second input module 1132 to which a command or data is input from the external electronic device 2000. The first input module 1131 may include, for example, a microphone, a mouse, a keyboard, a key (for example, a button), or a pen (for example, a passive pen or an active pen). The second input module 1132 may support a designated protocol capable of connecting to the external electronic device 2000 by wire or wirelessly. According to an embodiment, the second input module 1132 may include, for example, a high definition multimedia interface (HDMI), a universal serial bus (USB) interface, an SD card interface, or an audio interface. The second input module 1132 may include a connector capable of physically connecting to the external electronic device 2000, for example, an HDMI connector, a USB connector, an SD card connector, or an audio connector (for example, a headphone connector).

The display module 1140 visually provides information to the user. The display module 1140 may include a display panel 1141, a gate driver 1142, and a source driver 1143. The gate driver 1142 may correspond to at least a portion of the scan driver 300 shown in FIG. 1. The source driver 1143 may correspond to at least a portion of the data driver 200 shown in FIG. 1. The display module 1140 may further include, for example, a window, a chassis, and a bracket for protecting the display panel 1141.

The display panel 1141 (or a display) may include a liquid crystal display panel, an organic light emitting display panel, or an inorganic light emitting display panel. However, the type of the display panel 1141 is not particularly limited. The display panel 1141 may be a rigid type or a flexible type that may be rolled, folded or bent. The display module 1140 may further include, for example, a supporter, a bracket, a heat dissipation member, or the like that supports the display panel 1141.

The gate driver 1142 may be mounted on the display panel 1141 as a driving chip. In addition, the gate driver 1142 may be integrated in the display panel 1141. For example, the gate driver 1142 may include an amorphous silicon TFT gate driver circuit (ASG), a low temperature polycrystalline silicon (LTPS) TFT gate driver circuit, or an oxide semiconductor TFT gate driver circuit (OSG) built in the display panel 1141. The gate driver 1142 receives a control signal from the controller 1112-1 and outputs scan signals to the display panel 1141 in response to the control signal.

The display module 1140 may further include an emission driver. The emission driver outputs an emission control signal to the display panel 1141 in response to the control signal received from the controller 1112-1. The emission driver may be formed separately from the gate driver 1142 or may be integrated into the gate driver 1142.

The source driver 1143 receives a control signal from the controller 1112-1, converts image data into an analog voltage (for example, a data signal) in response to the control signal, and then outputs the data signals to the display panel 1141.

The source driver 1143 may be integrated into another component (for example, the controller 1112-1). A function of the interface conversion circuit and the timing control circuit of the controller 1112-1 described above may be integrated into the source driver 1143.

The display module 1140 may further include a voltage generation circuit. The voltage generation circuit may output various voltages utilized for driving the display panel 1141. In an embodiment, the display panel 1141 may include a plurality of pixel columns each including a plurality of pixels.

In an embodiment, the source driver 1143 may convert data corresponding to red (R), green (G), and blue (B) (for example, the output data Dout) into a red data signal (or data voltage), a green data signal, and the blue data signal, and may provide the red data signal, the green data signal, and the blue data signal to the plurality of pixel columns included in the display panel 1141 during one horizontal period.

The power module 1150 supplies power to a component of the electronic device 1000. The power module 1150 may include a battery that charges a power voltage. The battery may include a non-rechargeable primary cell, and a rechargeable secondary cell or fuel cell. The power module 1150 may include a power management integrated circuit (PMIC). The PMIC supplies optimized power to each of the above-described modules and modules described below. The power module 1150 may include a wireless power transmission/reception member electrically connected to the battery. The wireless power transmission/reception member may include a plurality of antenna radiators of a coil form.

The electronic device 1000 may further include the internal module 1160 and the external module 1170. The internal module 1160 may include the sensor module 1161, the antenna module 1162, and the sound output module 1163. The external module 1170 may include the camera module 1171, a light module 1172, and the communication module 1173.

The sensor module 1161 may sense an input by a body of the user or an input by a pen among the first input module 1131, and may generate an electrical signal or a data value corresponding to the input. The sensor module 1161 may include at least one of a fingerprint sensor 1161-1, an input sensor 1161-2, and a digitizer 1161-3.

The fingerprint sensor 1161-1 may generate a data value corresponding to a fingerprint of the user. The fingerprint sensor 1161-1 may include any one of an optical type fingerprint sensor or a capacitive type fingerprint sensor.

The input sensor 1161-2 may generate a data value corresponding to coordinate information of the input by the body of the user or the pen. The input sensor 1161-2 generates a capacitance change amount by the input as the data value. The input sensor 1161-2 may sense an input by the passive pen or may transmit/receive data to and from the active pen.

The input sensor 1161-2 may measure a biometric signal such as, for example, blood pressure, water, or body fat. For example, when the user touches a sensor layer or a sensing panel with a body part and does not move during a certain time, the input sensor 1161-2 may sense the biometric signal based on a change of an electric field by the body part and output information desired by the user to the display module 1140.

The digitizer 1161-3 may generate a data value corresponding to coordinate information of the input by the pen. The digitizer 1161-3 generates an electromagnetic change amount by the input as the data value. The digitizer 1161-3 may sense the input by the passive pen or may transmit/receive data to and from the active pen.

At least one of the fingerprint sensor 1161-1, the input sensor 1161-2, and the digitizer 1161-3 may be implemented as the sensor layer formed on the display panel 1141 through a continuous process. The fingerprint sensor 1161-1, the input sensor 1161-2, and the digitizer 1161-3 may be disposed above the display panel 1141, and any one of the fingerprint sensor 1161-1, the input sensor 1161-2, and the digitizer 1161-3, for example, the digitizer 1161-3, may be disposed below the display panel 1141.

At least two of the fingerprint sensor 1161-1, the input sensor 1161-2, and the digitizer 1161-3 may be formed to be integrated into one sensing panel through the same process. When at least two of the fingerprint sensor 1161-1, the input sensor 1161-2, and the digitizer 1161-3 are integrated into one sensing panel, the sensing panel may be disposed between the display panel 1141 and a window disposed above the display panel 1141. According to an embodiment, the sensing panel may be disposed on the window. However, a position of the sensing panel is not particularly limited.

At least one of the fingerprint sensor 1161-1, the input sensor 1161-2, and the digitizer 1161-3 may be embedded in the display panel 1141. That is, at least one of the fingerprint sensor 1161-1, the input sensor 1161-2, and the digitizer 1161-3 may be simultaneously formed through a process of forming elements (for example, a light emitting element, a transistor, and the like) included in the display panel 1141.

In addition, the sensor module 1161 may generate an electrical signal or a data value corresponding to an internal state or an external state of the electronic device 1000. The sensor module 1161 may further include, for example, a gesture sensor, a gyro sensor, a barometric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The antenna module 1162 may include one or more antennas for transmitting a signal or power to the outside of the electronic device 1000 or receiving a signal or power from the outside of the electronic device 1000. According to an embodiment, the communication module 1173 may transmit a signal to an external electronic device or receive a signal from an external electronic device through an antenna suitable for a communication method. An antenna pattern of the antenna module 1162 may be integrated into one configuration (for example, the display panel 1141) of the display module 1140 or the input sensor 1161-2.

The sound output module 1163 is a device for outputting a sound signal to the outside of the electronic device 1000, and may include, for example, a speaker used for general purposes such as multimedia playback or recording playback, and a receiver used exclusively for receiving a call. According to an embodiment, the receiver may be formed integrally with or separately from the speaker. A sound output pattern of the sound output module 1163 may be integrated into the display module 1140.

The camera module 1171 may capture a still image and a moving image. According to an embodiment, the camera module 1171 may include one or more lenses, an image sensor, or an image signal processor. The camera module 1171 may further include, for example, an infrared camera capable of measuring presence or absence of the user, a position of the user, a gaze of the user, and the like.

The light module 1172 may provide light. The light module 1172 may include a light emitting diode or a xenon lamp. The light module 1172 may operate in conjunction with the camera module 1171 or may operate independently.

The communication module 1173 may support establishment of a wired or wireless communication channel between the electronic device 1000 and the external electronic device 2000 and communication performance through the established communication channel. The communication module 1173 may include any one or both of a wireless communication module such as, for example, a cellular communication module, a short-range wireless communication module, or a global navigation satellite system (GNSS) communication module, and a wired communication module such as, for example, a local area network (LAN) communication module or a power line communication module. The communication module 1173 may communicate with the external electronic device 2000 through a short-range communication network such as, for example, BLUETOOTH, WIFI direct, or infrared data association (IrDA), or a long-range communication network such as, for example, a cellular network, the Internet, or a computer network (for example, LAN or WAN). The above-described various types of communication modules 1173 may be implemented as a single chip or as separate chips.

The input module 1130, the sensor module 1161, the camera module 1171, and the like may be used to control an operation of the display module 1140 in conjunction with the processor 1110.

The processor 1110 outputs a command or data to the display module 1140, the sound output module 1163, the camera module 1171, or the light module 1172 based on input data received from the input module 1130. For example, the processor 1110 may generate image data in response to the input data applied through a mouse, an active pen, or the like and output the image data to the display module 1140, or generate command data in response to the input data and output the command data to the camera module 1171 or the light module 1172. When the input data is not received from the input module 1130 during a certain time, the processor 1110 may convert an operation mode of the electronic device 1000 to a low power mode or a sleep mode to reduce power consumed in the electronic device 1000.

The processor 1110 outputs a command or data to the display module 1140, the sound output module 1163, the camera module 1171, or the light module 1172 based on sensing data received from the sensor module 1161. For example, the processor 1110 may compare authentication data applied by the fingerprint sensor 1161-1 with authentication data stored in the memory 1120 and then execute an application according to a comparison result. The processor 1110 may execute the command based on sensing data sensed by the input sensor 1161-2 or the digitizer 1161-3 or output corresponding image data to the display module 1140. When the sensor module 1161 includes a temperature sensor, the processor 1110 may receive temperature data for a measured temperature from the sensor module 1161 and further perform luminance correction or the like on the image data based on the temperature data.

The processor 1110 may receive measurement data for, for example, the presence of the user, the position of the user, the gaze of the user, and the like, from the camera module 1171. The processor 1110 may further perform luminance correction or the like on the image data based on the measurement data. For example, the processor 1110 determining the presence or absence of the user through an input from the camera module 1171 may output image data of which a luminance is corrected through the data conversion circuit 1112-2 or the gamma correction circuit 1112-3 to the display module 1140.

Some of the above-described components may be connected to each other through a communication method between peripheral devices, for example, a bus, general purpose input/output (GPIO), a serial peripheral interface (SPI), a mobile industry processor interface (MIPI), or an ultra-path interconnect (UPI) link to exchange a signal (for example, a command or data) with each other. The processor 1110 may communicate with the display module 1140 through a mutually agreed interface, for example, may use any one of the above-described communication methods, and is not limited to the above-described communication method.

The electronic device 1000 according to embodiments of the disclosure may include various types of devices. The electronic device 1000 may include, for example, at least one of a portable communication device (for example, a smartphone), a computer device, a portable multimedia device, a portable medical device, a camera, a wearable device, and a home appliance device. However, the electronic device 1000 is not limited thereto.

As is traditional in the field of the disclosure, embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, etc., which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions.

While the disclosure has been particularly shown and described with reference to embodiments thereof, it will be understood by those of ordinary skill in the art that various changes in form and detail may be made therein without departing from the spirit and scope of the disclosure as defined by the following claims.

What is claimed is:

1. An electronic device, comprising:

a display panel comprising pixels positioned to be connected to scan lines and data lines and including a driving transistor and at least one light emitting element; and a processor configured to generate output data using input data and control the display panel;

wherein the processor is configured to:

correct input data using at least one of optical measurement information, a threshold voltage of each of the driving transistors, mobility information, dimming information, and temperature information to generate first data; and generate second data by reflecting age information of the light emitting element to the first data, generate third data by reflecting a current amount corresponding to the first data and a current amount corresponding to the second data, and generate the age information by accumulating the third data.

2. The electronic device according to claim 1, further comprising:

a current sensor configured to generate a global current value by measuring a current of a first power line commonly connected to the pixels, and wherein the processor is configured to generate a scale factor by reflecting the global current value and a load of the input data.

3. The electronic device according to claim 2, wherein the processor is further configured to generate the output data by reflecting the scale factor to the second data.

4. The electronic device according to claim 1, wherein the processor is further configured to:

generate the second data by reflecting the age information to the first data;

generate a compensation scale factor by reflecting an initial current amount corresponding to the first data and a compensation current amount corresponding to the second data;

generate the third data by reflecting the compensation scale factor to the second data; and accumulate the third data as the age information.

5. The electronic device according to claim 4, wherein the processor is further configured to generate the compensation scale factor by dividing the initial current amount by the compensation current amount.

6. The electronic device according to claim 4, wherein the processor is further configured to generate the third data by multiplying the compensation scale factor by the second data.

7. The electronic device according to claim 4, wherein the processor is further configured to calculate the compensation current amount using the age information and the first data.

8. The electronic device according to claim 4, wherein processor is further configured to calculate the compensation current amount using the second data input from the data changer.

9. The electronic device according to claim 1, wherein the display panel including the pixels is divided into a plurality of blocks including at least two or more pixels, and wherein processor is further configured to accumulate the age information in units of the block.

10. The electronic device according to claim 9, further comprising:

an age accumulator configured to accumulate the third data as the age information, wherein the processor is further configured to:

determine a position of the first data corresponding to the blocks to generate position information;

generate the second data by reflecting the block unit age information to the first data;

generate a representative value of the second data in units of the block;

generate a block compensation scale factor by reflecting an initial current amount corresponding to the first data and a compensation current amount corresponding to the second data in units of the block; and generate the third data by reflecting the block compensation scale factor to the representative value.

11. The electronic device according to claim 10, wherein the processor is further configured to generate the representative value by averaging the second data in units of the block.

12. The electronic device according to claim 10, wherein the processor is further configured to generate the block compensation scale factor using a ratio of the initial current amount and the compensation current amount in units of the block.

13. The electronic device according to claim 10, wherein the processor is further configured to calculate the compensation current amount using the block unit age information and the first data.

14. The electronic device according to claim 10, wherein the processor is further configured to calculate the compensation current amount in units of the block using the second data input from the data changer.

* * * * *